United States Patent [19]

Kato

[11] Patent Number: 4,636,699
[45] Date of Patent: Jan. 13, 1987

[54] INDUSTRIAL ROBOT CONTROL SYSTEM

[75] Inventor: Hisao Kato, Aichi, Japan

[73] Assignee: Mitsubishi Denki Kabushiki Kaisha, Tokyo, Japan

[21] Appl. No.: 780,741

[22] Filed: Sep. 27, 1985

[30] Foreign Application Priority Data

Sep. 27, 1984 [JP] Japan ............................... 59-202624

[51] Int. Cl.⁴ .............................................. G05B 19/42
[52] U.S. Cl. ..................................... 318/568; 318/563; 901/49
[58] Field of Search ............. 901/49; 318/568, 568 D, 318/563

[56] References Cited

U.S. PATENT DOCUMENTS

| 4,369,401 | 1/1983 | Fayfield et al. | 318/565 |
| 4,484,119 | 11/1984 | Kerr | 318/563 |
| 4,490,660 | 12/1984 | Tsuchihashi | 318/568 B |
| 4,557,660 | 12/1985 | Nakashima et al. | 901/49 |

Primary Examiner—Benjamin Dobeck
Attorney, Agent, or Firm—Sughrue, Mion, Zinn, Macpeak and Seas

[57] ABSTRACT

An industrial robot system for starting a robot moving to a predetermined location according to starting instructions is equipped with detecting devices operating when the location reached by the robot once started is within a predetermined range from the predetermined location. Accordingly, the system is capable of preventing accidents caused by the operation when the work origin has drifted due to an abnormality in the robot. Because the robot is only allowed to do its work after an output is given by the detecting devices operating only when the robot thus started is within the predetermined range from the predetermined location, the robot system is capable of not only preventing accidents caused by the presence of abnormalities, but also controlling the operation of the robot with little chance of trouble.

2 Claims, 8 Drawing Figures

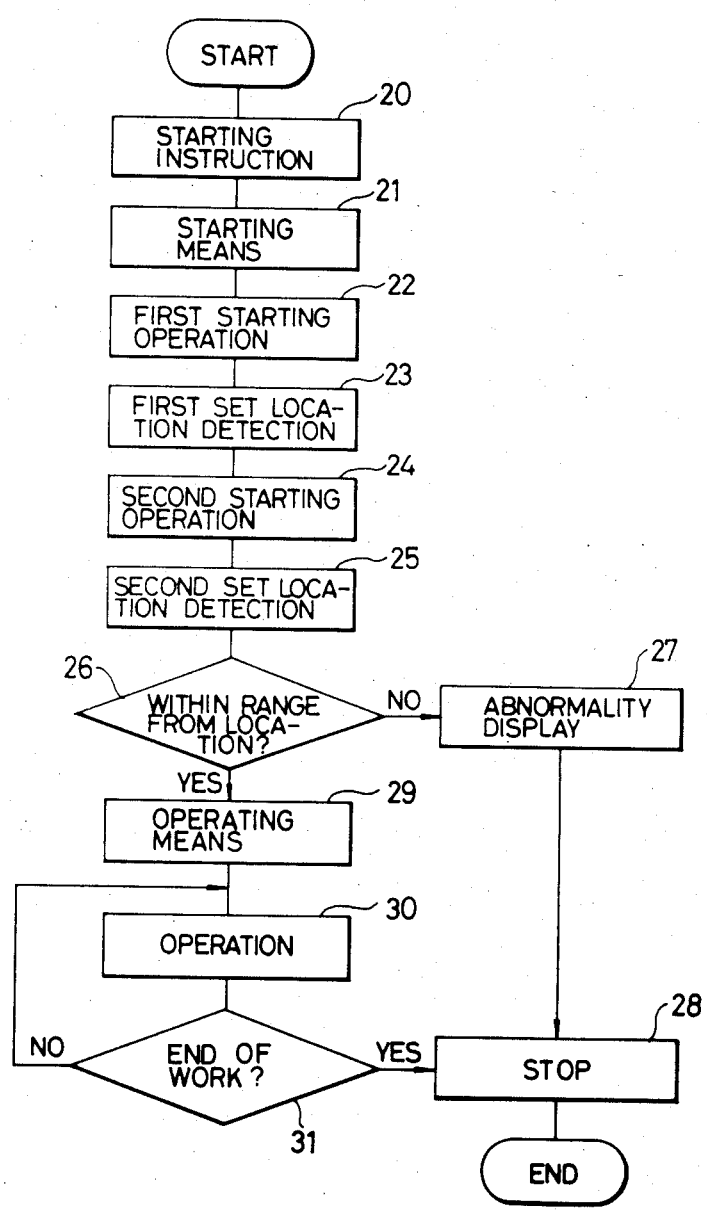

INDUSTRIAL ROBOT CONTROL SYSTEM

BACKGROUND OF THE INVENTION

The present invention relates to an industrial robot control system for starting an industrial robot moving to a predetermined location while detecting any abnormal behavior thereof before allowing the robot to carry on its designated work.

Japanese Pat. No. 55-21362, for instance, discloses an industrial robot operating under the control of programs, wherein the arm of the manipulator of the robot is moved by a series of control program steps so as to follow a continuously moving workpiece.

In this industrial robot, a problem arises in that the work origin may drift due to loose screws or other mechanical parts and failure of portions of the electrical circuitry, causing abnormal behavior of the robot. Particularly, when an industrial robot is started is when it is most likely to malfunction, possibly colliding with other machines.

SUMMARY OF THE INVENTION

The present invention is intended to solve the aforementioned problems, and it is therefore an object of the invention to provide an industrial robot control system for starting an industrial robot moving to a predetermined location while confirming the work origin.

It is another object of the present invention to provide an industrial robot control system for starting an industrial robot moving to a predetermined location by confirming the work origin before allowing the robot to carry on work.

The industrial robot control system according to the present invention is designed to start an industrial robot moving to a predetermined location according to starting instructions and check the way the robot reaches that location. There is provided additional means for allowing the industrial robot to commence its work, provided that the robot has reached the predetermined location in such a manner as to satisfy a predetermined range of requirements.

The industrial robot according to the present invention is prevented from starting work upon receiving starting instructions before the presence of drift of the work origin has been checked. Moreover, the industrial robot is allowed to start the work only when the work origin is proved to be at the normal position.

BRIEF DESCRIPTION OF THE DRAWINGS

FIG. 8 is a flowchart illustrating the operation of the embodiment of FIG. 1.

DESCRIPTION OF THE PREFERRED EMBODIMENTS

Referring now to FIGS. 1 through 8, a preferred embodiment of the present invention will be described.

Figure 1:
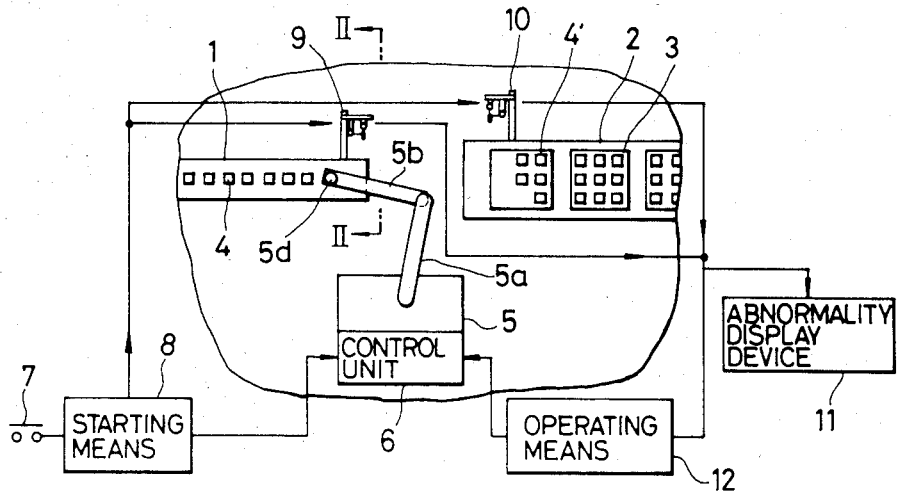
FIG. 1 is a conceptual diagram of an industrial robot system embodying the present invention.
Figure 2:
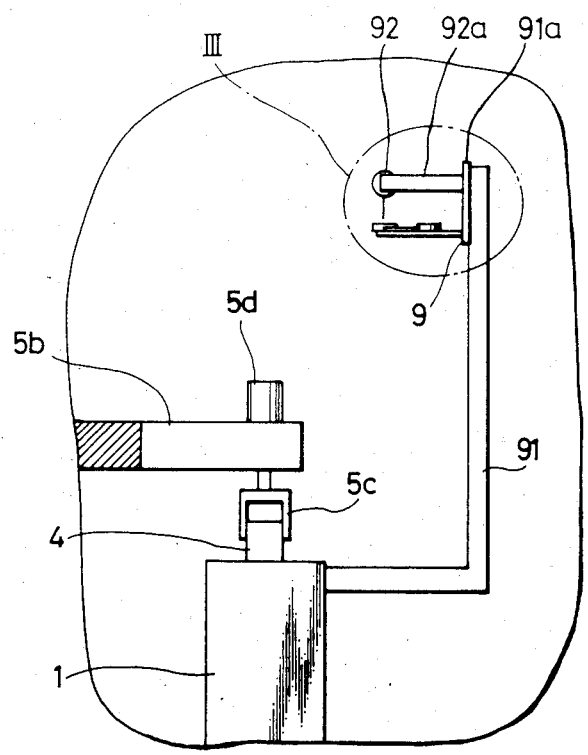
FIG. 2 is an enlarged cross-sectional view of a first detecting device of FIG. 1 taken on a line II—II.
Figure 3:
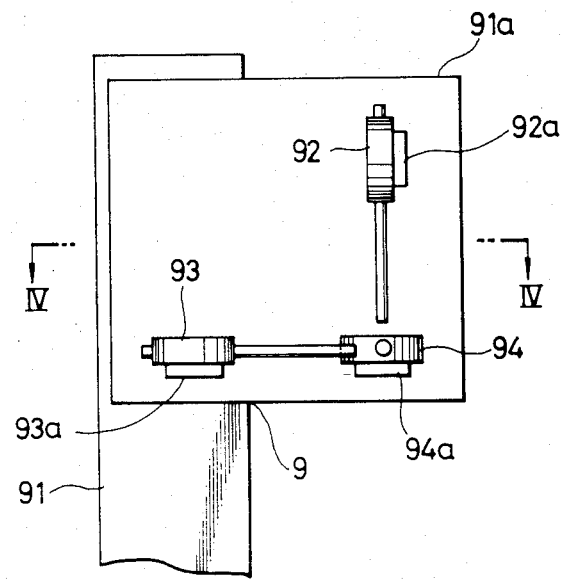
FIG. 3 is an enlarged left side view of a portion III designated in FIG. 2.
Figure 4:
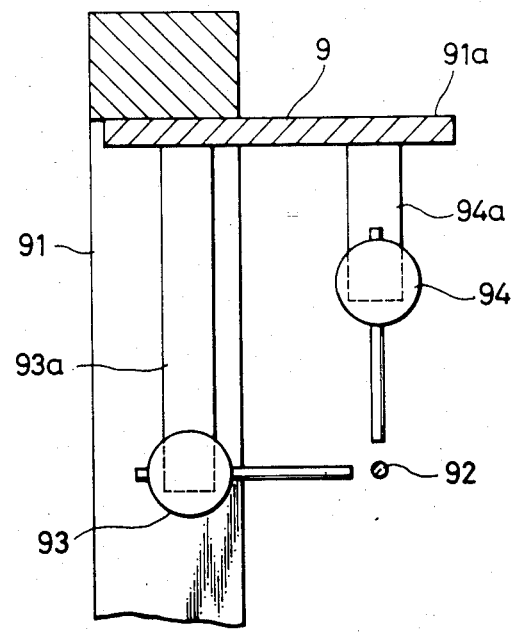
FIG. 4 is an enlarged cross-sectional view of FIG. 3 taken on a line IV—IV.

FIG. 1 illustrates the overall system configuration of the inventive robot system. As shown in FIG. 1, the system includes a supply conveyor 1; a work conveyor 2; a box 3 conveyed by the work conveyor 2; a part 4 conveyed by the supply conveyor 1; a part 4' placed at a designated position in the box 3; a robot 5 installed between the supply conveyor 1 and the work conveyor 2; a first arm 5a of the robot 5; a second arm 5b with one end pivotally mounted on the first arm 5a and the other end provided with a hand 5c; a cylindrical projection 5d provided at the forward end of the arm 5b on the opposite side of the hand 5c; a control device 6 of the robot 5; a starting instruction switch 7; a starting unit 8 for starting the arm 5b moving to a predetermined position according to a program for starting the robot 5 through the control device 6; a first detecting device 9 provided at the end of the supply conveyor 1; a second detecting device 10 provided at the end of the work conveyor 2 which operates when the arm 5b reaches a position within a predetermined range relative to the first and second detecting devices 9 and 10; an abnormality display device 11 composed of a photoelectric device, buzzer, etc., the abnormality display device 11 being energized only when the first and second detecting devices 9 and 10 are activated after the robot 5 has been started; and an operating unit 12 for starting the robot 5, the operating unit producing an output simultaneously with the operation of the first and second detecting devices 9 and 10 to operate the robot 5 through the control device 6.

FIGS. 2 through 6 illustrate the first detecting device 9, wherein like reference numerals designate like parts. In FIGS. 2 through 6, there is shown the detecting device 9, which includes a support 91 with a lower end fixed to the supply conveyor 1 in the upright position and the upper end supplied with a seat plate 91a; a first detector 92 of the first detecting device 9, the first detector 92 comprising a dial gauge type detector mounted on a fitting plate 92a projecting from the seat plate 91a and having a vertically displaceable sensing rod, that is, upwardly and downwardly; a second detector 93 similar to the first detector 92, the second detector 93 being mounted on a fitting plate 93a and having a horizontally displaceable sensing rod, that is, to the left and right; and a third detector 94 similar to the first detector, the third detector 94 being mounted on a fitting plate 94a and having a horizontally displaceable sensing rod oriented perpendicular to that of the second detector for lengthwise or back and forth movement relative thereto.

Figure 5:
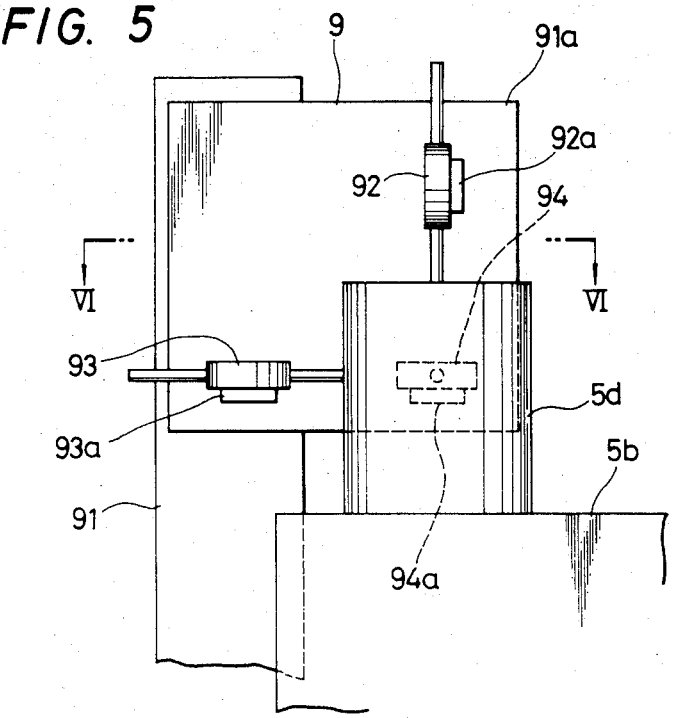
FIG. 5 is a diagram corresponding to FIG. 3 illustrating the operation of the first detecting device of FIG. 1.
Figure 6:
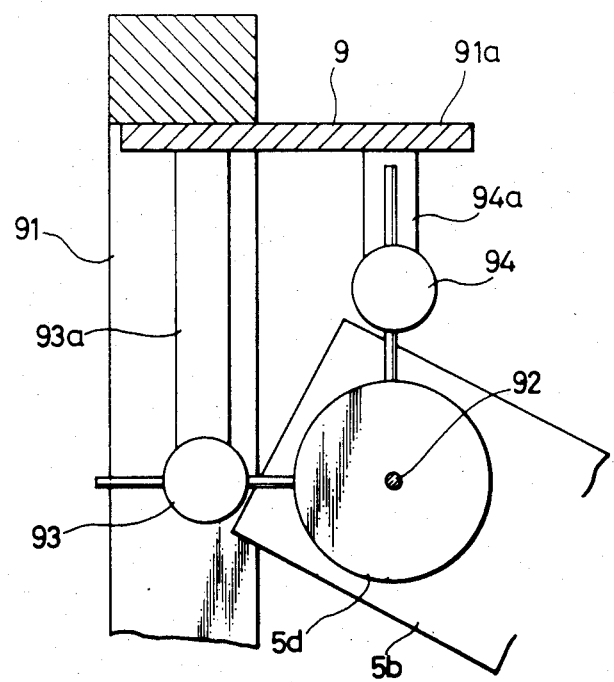
FIG. 6 is a cross-sectional view of FIG. 5 taken on a line VI—VI.

As shown in FIGS. 5 and 6, the sensing rods of the first through third detectors 92 to 94 are engaged and axially displaced by the projection 5d of the arm 5b. The first detecting device 9 operates, i.e. generates an output signal, when the pressure exerted on the sensing rods by the projection 5d, and thus the displacement of the rods, 5 is within a predetermined range, thereby indicating that the robot is functioning properly and that its positional accuracy has not deteriorated due to mechanical wear or the like to such an extent that it is no longer capable of correctly implementing its instructed work routine. Moreover, the second detecting device 10 (detailed illustration omitted) is provided at the end of the work conveyer 2 and equipped with first through third detectors, as in the case of the first detecting device 9, the second detecting device 10 operating when the pressure applied by the projection 5d is within a predetermined range.

Figure 7:
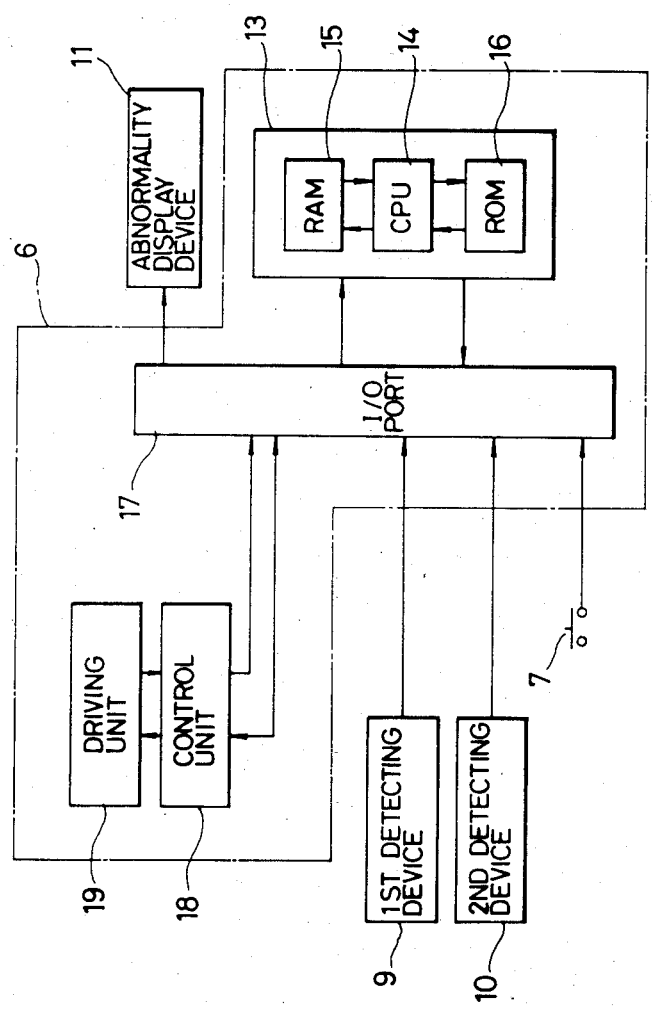
FIG. 7 is a conceptual circuit diagram illustrating the electrical connections of the embodiment of FIG. 1.

FIG. 7 is a circuit diagram illustrating the electrical connections of the overall system configuration of FIG. 1. The electrical system includes a computer 13 within the control device 6, a CPU 14, a RAM 15, a ROM 16, and I/O port 17, a control unit 18 of the robot 5, and driving unit 19 thereof.

Referring to the flowchart of FIG. 8, there will be described the operation of the system illustrated in FIG. 1.

In order to start the robot 5, the start instruction switch 7 is pressed by the operator and start instructions are given in Step 20. Then the robot 5, specifically, the arm 5b, is allowed by the starting unit 21, namely, by the program of the computer 13, to conduct the first starting operation in Step 22 through the control unit 18 and the driving unit 19 and stop at the predetermined location of the first detecting device 9. As shown in FIGS. 5 and 6, the first through third detectors 92 to 94 are pressed by the projection 5d, and the detection of the first predetermined location in Step 23 is made depending on the level of the applied pressure. Subsequently, the robot 5 is restarted in accordance with the computer 13 program, and the working arms 5a, 5b are allowed to conduct the second starting operation in Step 24 and stop at the predetermined position of the second detecting device 10, whereby the detection of the second predetermined location in Step 25 is implemented as in the case of the first detecting device 9. The abnormality display 11 is energized, as instructed in Step 27, to inform the operator of trouble if the results of the detection of the first and second predetermined locations in Steps 23 and 25 are judged by the computer 13 to be outside the predetermined range, whereupon, in Step 28, the robot 5 is stopped. Thus, the robot 5 is prevented from causing trouble because it is not allowed to operate using an offset work origin caused by the presence of abnormality.

On the other hand, if the results of the detection in Steps 23 and 25 are judged within the predetermined range in Step 26, the operating unit in Step 29 is activated by the program of the computer 13, and the robot 5 will be allowed to do its assigned work in Step 30, that is, the part 4 will be transferred from the supply conveyer 1 to the predetermined position in the box 3. Unless the work is finished in Step 31, the robot 5 will continue to do the work; otherwise, it stops working in Step 28.

Thus, the robot 5 is allowed to start carrying out its work automatically, provided that the results of the initial operation of the robot 5 satisfy the predetermined requirements in terms of the predetermined range, that is, if the work origin is not offset from the expected position. As a result, accidents caused by work origin drift are prevented.

As set forth above, detecting devices are provided for starting the robot moving to a predetermined location according to starting instructions and allowing the robot to do its work provided that the location reached by this initial operation is within a predetermined range. Accordingly, the industrial robot system provided according to the present invention is capable of preventing accidents caused due to drift of the work origin.

Moreover, because the robot is not allowed to do its work until an output is given by the detecting devices operating only when the robot thus started is within the predetermined range from the predetermined location, the industrial robot control system according to the present invention is capable not only of preventing accidents caused by the presence of abnormalities, but also operations of the robot are controlled with little chance of trouble.

I claim:

1. A movement accuracy verification system for an industrial robot (5) having controlled arm means (5a, 5b) adapted to execute movements between first and second spaced positions, comprising:
   (a) first and second detecting means (9, 10) respectively disposed proximate said first and second positions, each detecting means comprising three detectors (92, 93, 94) having mutually orthogonal, axially displaceable sensing rods whose axes converge at a common point,
   (b) a contact member (5d) mounted to and projecting outwardly from an end of the robot arm means proximate a controllable work implement (5c),
   (c) means for successively moving the end of the arm means to the first and second detecting means in response to a start instruction such that, under normal operating conditions, the contact member engages and axially displaces all of the sensing rods of each detecting means within a predetermined range and the detecting means generate respective output signals in response to such displacements, and
   (d) means for inhibiting program controlled working movements of the robot arm means in the absence of an output signal from either one of the detecting means.

2. A system according to claim 1, wherein the contact member comprises a cylinder mounted to the end of the arm means on a side opposite the work implement.

* * * * *